US012061433B2

(12) United States Patent
Maeda

(10) Patent No.: US 12,061,433 B2
(45) Date of Patent: Aug. 13, 2024

(54) IMAGE FORMING APPARATUS AND METHOD OF CORRECTING IMAGE POSITIONAL DEVIATION

(71) Applicant: Katsuhiko Maeda, Kanagawa (JP)

(72) Inventor: Katsuhiko Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/197,219

(22) Filed: Mar. 10, 2021

(65) Prior Publication Data

US 2021/0302894 A1 Sep. 30, 2021

(30) Foreign Application Priority Data

Mar. 31, 2020 (JP) ................................ 2020-064072

(51) Int. Cl.
*B41J 29/38* (2006.01)
*G03G 15/00* (2006.01)

(52) U.S. Cl.
CPC ................................ *G03G 15/6567* (2013.01)

(58) Field of Classification Search
None
See application file for complete search history.

(56) References Cited

U.S. PATENT DOCUMENTS 5,559,594 A * 9/1996 Ohhata .................. G03G 15/60 271/226
5,786,594 A * 7/1998 Ito ........................ H04N 1/1916 250/236
5,963,240 A 10/1999 Shinohara et al.
2001/0028387 A1 10/2001 Maeda
2003/0030718 A1 2/2003 Maeda
(Continued)

FOREIGN PATENT DOCUMENTS

JP 01014853 A * 1/1989
JP 9-269455 10/1997
(Continued)

OTHER PUBLICATIONS

Title: "Stepper Motor Calculations—CNC.xyz Wiki"; URL: https://wiki.cnc.xyz/Stepper_Motor_Calculations (Year: 2014).*
(Continued)

*Primary Examiner* — Jill E Culler
*Assistant Examiner* — Ruben C Parco, Jr.
(74) *Attorney, Agent, or Firm* — Harness, Dickey & Pierce, P.L.C.

(57) ABSTRACT

An image forming apparatus includes a light beam scanner to scan an image bearer by a light beam according to data on a pattern for image positional deviation correction and a developing device to develop a latent image of the pattern. The pattern is formed on the image bearer by scanning performed by the light beam scanner. The image forming apparatus includes a transfer belt to transfer the pattern to a medium, a sensor to read the pattern to obtain an amount of image positional deviation, a skew correction device to adjust a tilt of an optical member of the light beam scanner according to a skew amount to correct a skew and perform the image positional deviation correction according to the amount of image positional deviation, and circuitry to drive the skew correction device before the image positional deviation correction.

17 Claims, 15 Drawing Sheets

(56) References Cited

U.S. PATENT DOCUMENTS

| | | | | |
|---|---|---|---|---|
| 2004/0160506 | A1 | 8/2004 | Maeda | |
| 2005/0184229 | A1 | 8/2005 | Maeda | |
| 2008/0253786 | A1* | 10/2008 | Isobe | G03G 15/0194 399/69 |
| 2011/0228030 | A1 | 9/2011 | Maeda | |
| 2015/0362881 | A1* | 12/2015 | Tosaka | G03G 15/5058 399/395 |
| 2018/0226863 | A1* | 8/2018 | Howack | H02K 37/24 |

FOREIGN PATENT DOCUMENTS

| | | | | |
|---|---|---|---|---|
| JP | 2002-283619 | | | 10/2002 |
| JP | 2010-181572 | | | 8/2010 |
| JP | 2010181572 | A | * | 8/2010 |
| JP | 2012-058678 | A | | 3/2012 |
| JP | 2017194649 | A | * | 10/2017 |

OTHER PUBLICATIONS

Office Action dated Oct. 17, 2023 issued in corresponding Japanese Patent Application No. 2020-064072.

* cited by examiner

IMAGE FORMING APPARATUS AND METHOD OF CORRECTING IMAGE POSITIONAL DEVIATION

CROSS-REFERENCE TO RELATED APPLICATION

This patent application is based on and claims priority pursuant to 35 U.S.C. § 119(a) to Japanese Patent Application No. 2020-064072, filed on Mar. 31, 2020, in the Japan Patent Office, the entire disclosure of which is hereby incorporated by reference.

BACKGROUND

Technical Field

Embodiments of the present disclosure relate to an image forming apparatus and a method of correcting image positional deviation.

Related Art

In an image forming apparatus applying electrophotographic technology, a photoconductor drum that serves as an image bearer is charged by a charging device, and the charged photoconductor drum is irradiated with a light beam according to image data to form a latent image. Then, the latent image formed on the photoconductor drum is developed by a developing device, and the developed image (that is, "toner image") is transferred to a recording sheet, which is a medium. As a result, an image corresponding to the toner image is formed on the recording sheet.

In addition, there is a known tandem color image forming apparatus including a plurality of image forming stations on which such a series of image forming processes is executed. In such a tandem type color image forming apparatus, the plurality of image forming stations is arranged along an intermediate transfer belt, and a toner image ter each of the colors of cyan (C), magenta (M), yellow (Y), and black (K) is formed on the corresponding one of the photoconductor drums, and thereby forming a color toner image. A plurality of systems is known for such a tandem configuration. For example, an "intermediate transfer type" is known. In the "intermediate transfer type", toner images formed on the photoconductor drums are sequentially transferred to a surface of an intermediate transfer belt, which is an endless belt, to be superposed with one another. Then a toner image on an intermediate transfer belt is transferred on a recording sheet. In addition, a "direct transfer type" is also known. In the "direct transfer type, toner images formed on the photoconductor drums are sequentially transferred to be superimposed with one another on a recording sheet conveyed by a conveyor belt, which is an endless belt.

Regardless of the intermediate transfer type or the direct transfer type, in such a tandem color image forming apparatus, in a case where a transfer position of each color shifts, or deviates from a corresponding ideal position when the toner images for each color are transferred to be superimposed with one other, an image with color shift is formed on a recording sheet.

To deal with this, there is a known tandem color image forming apparatus that has a function of performing an image positional deviation correction. In such an image positional deviation correction, for example, an image pattern for positional deviation correction is formed on the intermediate transfer belt or the conveyor belt by toner for each color. Then, the formed pattern for positional deviation correction is read by using a photoelectric sensor. For example, in a case where the color of black is set as a reference, with respect to the other three colors, a skew (deviation that is an inclination from the scanning line), a misregistration in the main scanning direction, a misregistration in the sub-scanning direction, and an image positional deviation, which is caused by a magnification error in the main scanning direction, are calculated. By feedback control that cancels the calculated "deviation", the color shift of the image is reduced.

In such an image positional deviation correction, with respect to a skew correction, the tilts of optical members such as mirrors and lenses inside a light beam writing unit are adjusted according to a skew amount by an adjustment mechanism including actuators such as a stepping motor and a gear.

SUMMARY

An exemplary embodiment of the present disclosure includes an image forming apparatus including a light beam scanner to scan an image bearer by a light beam according to data on a pattern for image positional deviation correction and a developing device to develop a latent image of the pattern for image positional deviation correction. The pattern for image positional deviation correction is formed on the image bearer by scanning performed by the light beam scanner. The image forming apparatus includes a transfer belt to transfer the pattern for image positional deviation correction to a medium, a sensor to read the pattern to obtain an amount of image positional deviation, a skew correction device to adjust a tilt of an optical member of the light beam scanner according to a skew amount to correct a skew and perform the image positional deviation correction according to the amount of image positional deviation, and circuitry to drive the skew correction device before the image positional deviation correction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
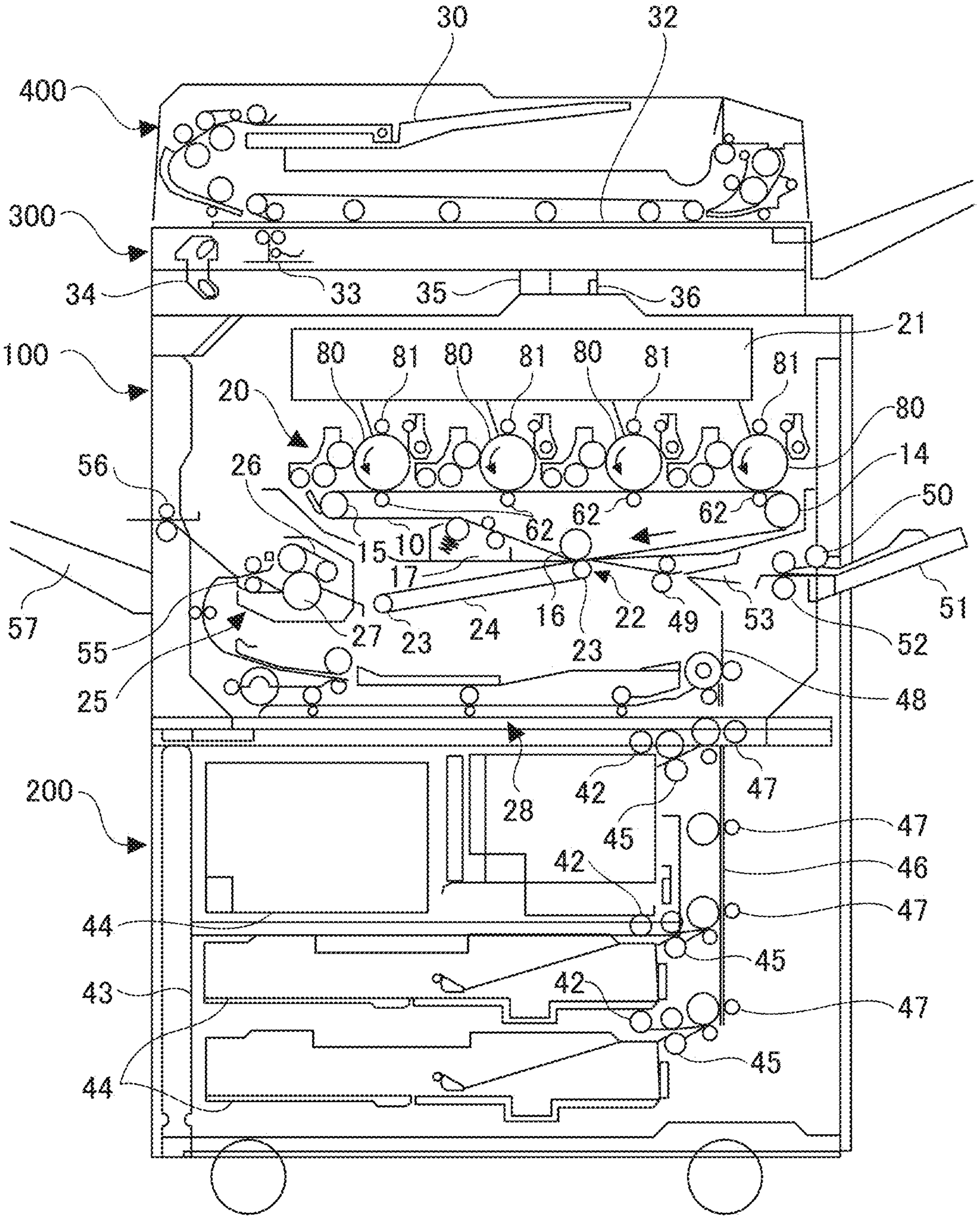
FIG. 1 is a schematic view of an image forming apparatus according to an exemplary embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as \veil, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is given of one of the embodiments of the present disclosure with reference to the attached drawings.

Configuration of Image Forming Apparatus

FIG. 1 is a schematic view of an image forming apparatus according to an exemplary embodiment of the present disclosure. The image forming apparatus according to the present embodiment includes, for example, a printer 100, a sheet feeding table 200, an image reader 300, and an automatic document feeder (ADS') 400.

The printer 100 includes an intermediate transfer unit in the center. The intermediate transfer unit includes an intermediate transfer belt 10 that is an endless belt. The intermediate transfer belt 10 is entrained around three support rollers that are a first support roller 14, a second support roller 15, and a third support roller 16, and is driven to rotate in a clockwise direction. An intermediate transfer belt cleaner 17 is disposed at a right side of the second support roller 15 and removes the residual toner remaining on the intermediate transfer belt 10 after an image transfer. On the intermediate transfer belt 10 between the first support roller 14 and the second support roller 15, an image forming device 20 is provided. The image forming device 20 includes a photoconductor unit 80, a charging unit 81, a developing unit (developing device) 84 (see FIG. 2), and a cleaning unit 83 (see FIG. 2) arranged for each of yellow (Y), magenta (M), cyan (C), and black (K). The sets of the photoconductor units 80, the charging units 81, the developing units (developing devices) 84, and the cleaning units 83 for Y, M, C and K, are arranged side by side along the direction of rotation of the intermediate transfer belt 10. The image forming device 20 is removable from a main body of the printer 100. That is, although the printer 100 according to the present embodiment uses an "intermediate transfer method", one or more embodiments of the disclosure are also applicable to printers that uses a "direct transfer method".

Above the image forming device 20, a light beam scanner 21 is provided and irradiates laser light to a photoconductive drum of each photoconductor unit 80 to form a latent image thereon for a corresponding color. Below the intermediate transfer belt 10, a secondary transfer device 22 is provided. In the secondary transfer device 22, an endless secondary transfer belt 24 entrained around two secondary transfer rollers 23 pushes up the intermediate transfer belt 10 to press the intermediate transfer belt 10 against the third support roller 16. A toner image is transferred from the intermediate transfer belt 10 onto a sheet at an area of contact between the secondary transfer belt 24 and the intermediate transfer belt 10.

On a side of the secondary transfer device 22, a fixing device 25 for fixing a transfer image on the sheet, is provided. The sheet on which a toner image is transferred is transported to the fixing device 25. The fixing device 25 includes a fixing belt 26, which is an endless belt, and a pressure roller 27 pressed against the fixing belt 26. Below the secondary transfer device 22 and the fixing device 25 is a sheet reversing device 28 that reverses the sheet immediately after the toner image is fixed onto the front side of the sheet P, so that another toner image is formed on the back side of the sheet, Operation of Image Forming Apparatus A description is given below of operation of an image forming apparatus according to one of the embodiments of the present disclosure.

When a document is on a sheet feeding tray 30 of the ADF 400, and a start switch or button of an operation unit is pressed, the ADF 400 conveys the document to an exposure glass 32. When there is no document in the ADF 400, a scanner of the image reader 300 is driven to read a document placed on the exposure glass 32. In particular, a first carriage 33 and a second carriage 34 are driven to read or scan the document. The first carriage 33 carries, e.g., a light source and a first mirror. The light source emits light to the exposure glass 32. The light is reflected from the original surface and strikes the first minor, which reflects the light toward the second carriage 34. A second mirror carried on the second carriage 34 reflects the light to a charge-coupled device (CCD) 36, serving as a reading or image sensor, via an imaging lens 35. Thus, the CCD 36 captures an image and generates an image signal by photoelectric conversion. Record data of each color of Y, M, C, and K is generated based on the image signals obtained by the CCD 36.

In addition, in response to a user operation of pressing the start switch, an image output instruction from, for example, a personal computer (PC), or a fax (facsimile data) output instruction, the intermediate transfer belt 10 starts driving and rotating, and the image forming device 20 starts preparing each unit for an image forming operation, resulting in starting a sequence for each color in an image forming process. Then, an exposure laser modulated based on the record data for each color is projected onto the photoconductor drum for the corresponding color, and through the image forming process, the toner images for the colors are transferred on the intermediate transfer belt 10 to be superimposed each other, resulting in forming one image (toner image).

A sheet is conveyed to enter the secondary transfer device 22 at the same time when an end of the toner image enters the secondary transfer device 22, and thereby the toner image on the intermediate transfer belt 10 is transferred on the sheet. The sheet on which the toner image has been transferred is conveyed to the fixing device 25, and the toner image is fixed to the sheet.

Regarding the above-mentioned sheet, one of a plurality of sheet feeding rollers 42 of the sheet feeding table 200 is selectively driven and rotated so that the sheet is fed out from one of a plurality of sheet feeding trays 44 provided in a sheet feeding device 43. Then, a separation roller 45 separates from the other sheets the sheet to be entered in a first conveyance roller unit 46 so that a conveyance roller 47 conveys the sheet to a second conveyance roller unit 48, which is provided in the printer 100, and the sheet is brought into contact with a registration roller 49 of the second conveyance roller unit 48. Finally, the sheet is conveyed to the secondary transfer device 22 at the same time when the end of the toner image enters the secondary transfer device 22 as described above.

The sheet may be inserted into a bypass sheet feeding tray 51 for sheet feeding. When the bypass sheet feeding tray 51 is used for sheet feeding, namely, when a user insert sheets onto the bypass sheet feeding tray 51, the printer 100 causes a sheet feeding roller 50 to drive and rotate to separate one sheet from the other sheets on the sheet feeding tray 51. Then, the separated sheet is conveyed to a bypass conveyance passage 53. Then, the sheet is brought into contact with the registration roller 49 in substantially the same manner as described above.

The sheet discharged after a fixing process performed by the fixing device 25 is guided to an output roller 56 by a switching claw 55 and stacked on a sheet output tray 57. Alternatively, the sheet is guided by the switching claw 55 to a sheet reversing device 28 at which the sheet is reversed to be guided to a transfer position again, and an image is recorded on an opposite surface of the sheet to be output by the output roller 56 to the sheet output tray 57. With regard to the residual toner remaining on the intermediate transfer belt 10 after the above-described transfer process, the intermediate transfer belt cleaner 17 removes the residual toner from the outer circumferential surface of the intermediate transfer belt 10, rendering the intermediate transfer belt 10 ready for a next image formation.

Configuration of Image Forming Device

Figure 2:
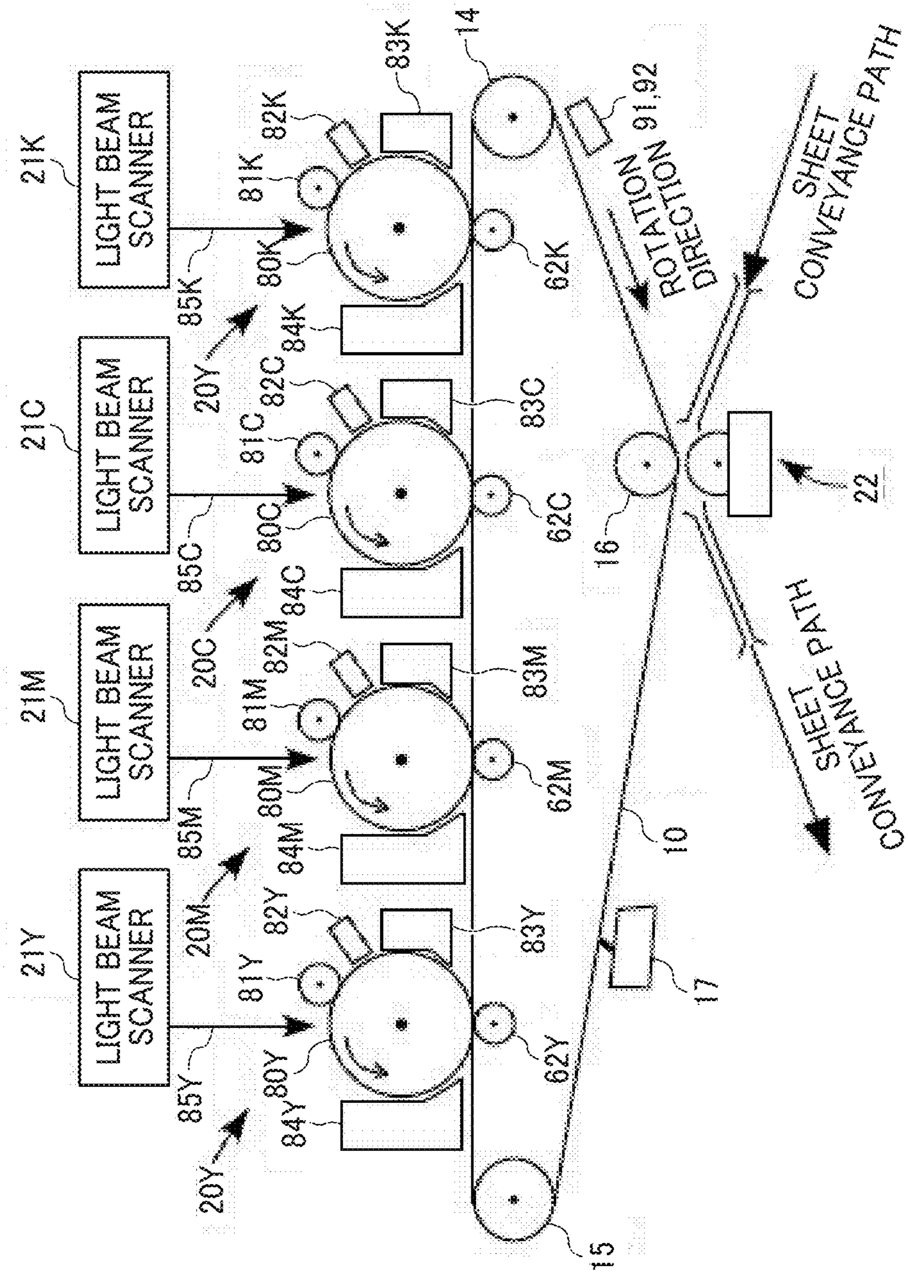
FIG. 2 is a schematic view of an image forming device of the image forming apparatus according to the exemplary embodiment of the present disclosure.

FIG. 2 is a schematic view of an image forming device of an image forming apparatus according to the exemplary embodiment of the present disclosure. The image forming device 20 according to the present embodiment includes, for example, four image forming units 20Y, 20M, 20C, and 20K, and the four light beam scanners 21Y, 21M, 21C, and 21K, to superimpose toner images of four colors (i.e., yellow, magenta, cyan, and black) one atop another, thereby forming a composite color toner image. A description of the light beam scanner 21 is given later with reference to FIG. 3.

For each color, around each of the photoconductor units 80Y, 80M, 80C, and 80K, a corresponding one of the charging unit 81Y 81M, 81C, and 81K, a corresponding one of discharging devices 82Y, 82M, 82C, and 82K, a corresponding one of the cleaning units 83Y, 83M, 83C, and 83K, a corresponding one of the developing units (developing devices) 84Y, 84M, 84C, and 84K, and a corresponding one of transfer devices 62Y, 62M, 62C, and 62K are provided. A first color image is formed on the intermediate transfer belt 10 through a general electrophotographic process including charging, exposing (forming a latent image), developing, and transferring. Then a second color image, a third color image, and a fourth color image are sequentially transferred on the intermediate transfer belt 10 one by one in order. As a result, a color image in which the four color images are superimposed with each other is formed. Further, the secondary transfer device 22 transfers the image formed on the intermediate transfer belt 10 to the conveyed recording sheet, which is a medium, to form a color image in which the four color images are superimposed with each other on the recording sheet. As a result, the image is fixed on the recording sheet by the fixing device 25, which is illustrated in FIG. 1.

The image forming device 20 further includes the intermediate transfer belt cleaner 17, which removes the residual toner image on the intermediate transfer belt 10. The image forming device 20 further includes a first sensor 91 and a second sensor 92 each for detecting a pattern for image positional deviation correction formed on the intermediate transfer belt 10. The first sensor 91 and the second sensor 92 are reflection type photoelectric sensors. The first sensor 91 and the second sensor 92 detect a pattern for image positional deviation correction formed on the intermediate transfer belt 10. Based on the detection result, data that indicates an image positional deviation between colors in the main scanning direction and in the sub-scanning direction, a skew, and each image positional deviation in an image magnification in the main scanning direction is obtained.

Configuration of Light Beam Scanner and Image Formation Control Unit

Figure 3:
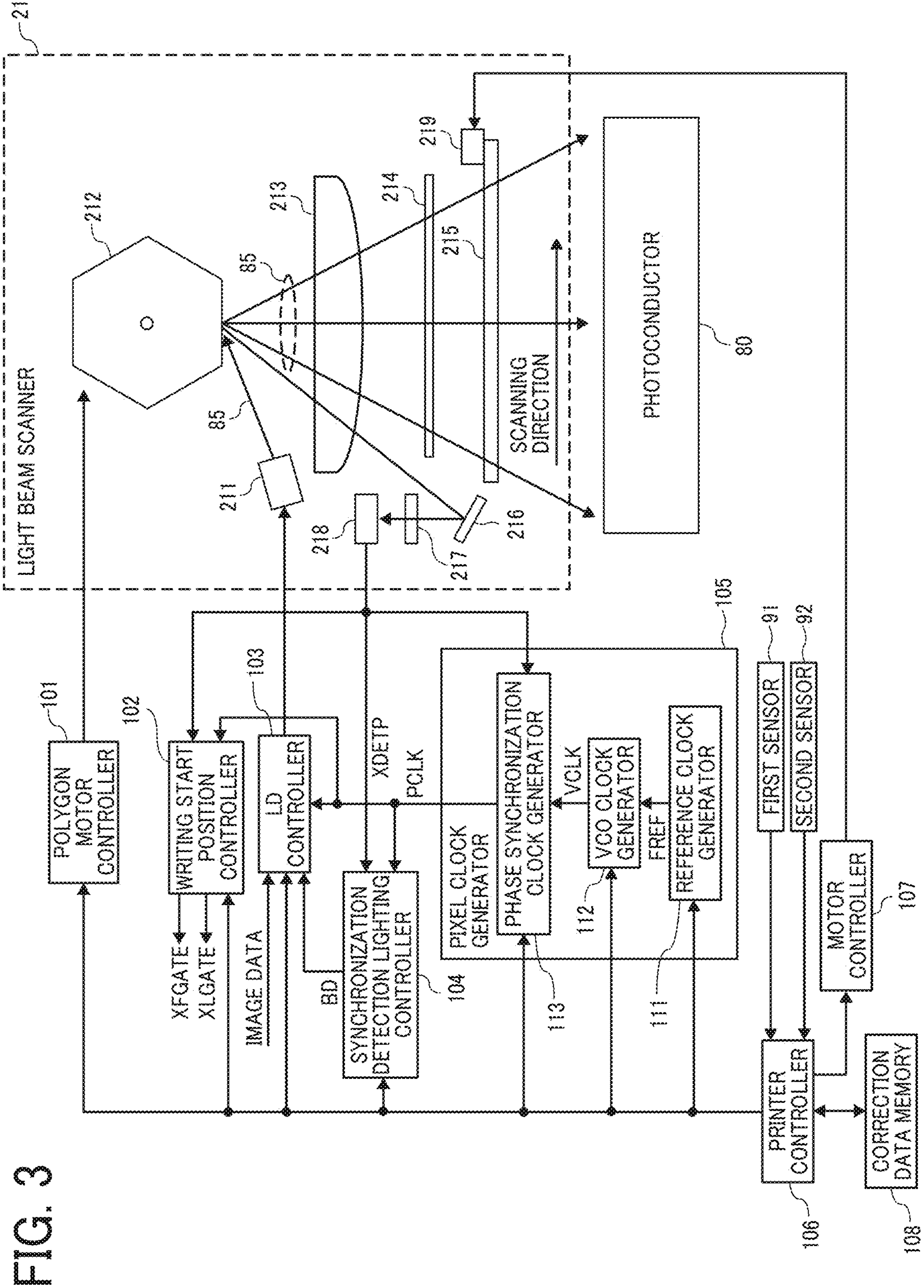
FIG. 3 is a diagram illustrating a configuration of a light beam scanner and an image formation control unit of the image forming apparatus according to the exemplary embodiment of the present disclosure.

FIG. 3 is a diagram illustrating a configuration of a light beam scanner and an image formation control unit of an image forming apparatus according to the exemplary embodiment of the present disclosure. FIG. 3 depicts the configuration of the light beam scanner and the image formation control unit for a single color. The elements of the configuration except for the printer controller 106, a correction data memory—108, and the first sensor 91 and the second sensor 92 are provided for each color. Since the light beam scanners 215; 21M, 21C, and 21K have configurations identical to each other, a description is given of the configuration of one of the light beam scanners 21Y, 21M, 21C, and 21K, as the configuration of the light beam scanner 21, with reference to FIG. 3.

The light beam scanner 21 includes, for example, a laser diode (LD) unit 211, a polygon mirror 212, an fθ lens 213, a second lens 214, a folding mirror 215, a synchronization mirror 216, a synchronization lens 217, and a synchronization detection sensor 218.

The LD unit 211 selectively emits a light beam 85 by being driven and modulated according to the image data. The emitted light beam 85 that is deflected by the polygon mirror 212 rotated by the polygon motor, passes through the fθ lens 213 and the second lens 214. Then, the light beam 85 is reflected by the folding mirror 215 and scans on the photoconductor unit 80 serving as the image bearer, which results in forming a latent image.

The synchronization detection sensor 218 is provided on the image writing side of a main scanning direction end of the light beam scanner 21. The light beam 85 emitted from the LD unit 211, deflected by the polygon mirror 212, and transmitted through the fθ lens 213 is reflected by the synchronous mirror 216, condensed by the synchronous lens 217, and incident on the synchronous detection sensor 218.

When the light beam 85 passes over the synchronization detection sensor 218, a synchronization detection signal XDETP is output from the synchronization detection sensor 218, and sent to the waiting start position controller 102, the synchronization detection lighting controller 104, and the pixel clock generator 105.

The pixel dock generator 105 generates a pixel clock PCLK synchronized with the synchronization detection signal XDETP. The pixel clock generator 105 sends the pixel clock PCLK to the writing start position controller 102, the LD controller 103, and the synchronization detection lighting controller 104.

The pixel clock generator 105 includes, for example, a reference clock generator 111, a Voltage Controlled Oscillator (VCO) clock generator 112, and a phase synchronization clock generator 113.

In the pixel clock generator 105, the reference clock generator 111 generates a reference clock FRET to be output to the VCO clock generator 112, and the VCO clock generator 112 generates a clock VCLK based on the reference clock FRET to be output to the phase synchronization clock generator 113. The phase synchronization clock generator 113 generates the pixel clock PCLK, which is synchronized with the synchronization detection signal XDETP, based on the clock VCLK generated by the VCO clock generator 112 and the synchronization detection signal XDETP, and outputs the pixel clock PCLK, which is synchronized with the synchronization detection signal XDETP, to the writing start position controller 102, the LD controller 103, and the synchronization detection lighting controller 104.

Internal Configuration of VCO Clock Generator

Figure 4:
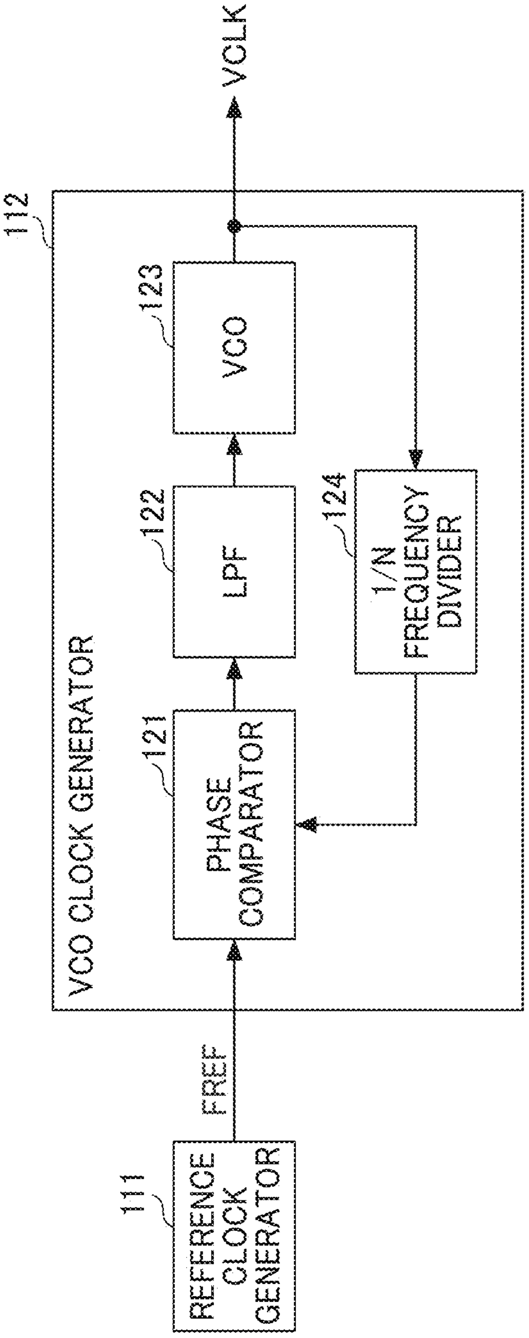
FIG. 4 is a block diagram illustrating an internal configuration of a voltage controlled oscillator (VCO) clock generator illustrated in FIG. 3, according to the exemplary embodiment of the present disclosure.

A description is given below of an internal configuration of the VCO clock generator 112. FIG. 4 is a block diagram illustrating an internal configuration of the VCO clock generator illustrated in FIG. 3, according to the exemplary embodiment of the present disclosure.

As illustrated in FIG. 4, the VCO clock generator 112 includes, for example, a phase comparator 121, a low-pass filter (LPF) 122, a VCO 123, and a 1/N frequency divider 124.

The VCO clock generator 112 inputs to the phase comparator 121 the reference clock FRET from the reference clock generator 111 and a signal obtained by dividing the clock VCLK output from the VCO 123 by N by the 1/N frequency divider 124. The phase comparator 121 compares phases of the falling edges of the two input signals (i.e., the reference clock signal FREF and the VCO clock signal VCLK). The phase comparator 121 then outputs an error component to the LPF 122 with constant current. Then, an unnecessary high frequency component and noise are removed from the error component by the LPF 122 and the error component is sent to the VCO 123. The VCO 123 outputs the VCO clock signal VCLK having an oscillation frequency depending on the output of the LPF 122.

As a result, the frequency of the FRET and the value of the frequency division ratio N are changed from the printer controller 106, and the frequency of the VCLK is changed, accordingly. As the frequency of VCLK changes, the frequency of the pixel clock PCLK also changes.

Referring back to FIG. 3, the synchronization detection lighting controller 104 turns on an LD forced lighting signal BD such that the LD unit 211 is forced to emit light in order to firstly detect the synchronization detection signal XDETP. In addition, after detecting the synchronization detection signal XDETP, the synchronization detection lighting controller 104 causes the LD unit 211 to be turned on such that the synchronization detection signal XDETP is reliably detected so as not to generate flare light, by using the synchronization detection signal XDETP and the pixel clock PCLK. Then, the synchronization detection lighting controller 104 generates the LD forced lighting signal BD to turn off the LD unit 211 after detecting the synchronization detection signal XDETP. The synchronization detection lighting controller 104 then sends the LD forced lighting signal BD to the LD controller 103.

In addition, the synchronization detection lighting controller 104 generates a light amount control timing signal APC for the LD unit 211 for each color, with the synchronization detection signal XDETP and the pixel clock PCLK. The synchronization detection lighting controller 104 then sends the light amount control timing signal APC to the LD controller 103. The light amount control timing signal APC is executed outside an image writing area. At the time of outputting the light amount control timing signal APC, the light amount is controlled to a target light amount.

The LID controller 103 controls lighting of the LD unit 211 according to the LD forced lighting signal BD, the light amount control timing signal APC, and image data synchronized with the pixel clock PCLK. Then, a laser beam is emitted from the LI) unit 211, is deflected by the polygon mirror 212, passes through the fθ lens 213 and the second lens 214, and is scans on the photoconductor unit 80 by the folding mirror 215.

The polygon motor controller 101 controls rotation of the polygon motor according to a control signal from the printer controller 106. Specifically, the polygon motor controller 101 controls the polygon motor such that the polygon motor rotates at a predetermined number of rotation or a predetermined rotation speed. A writing start position controller 102, serving as a writing position controller, generates a main scanning control signal XLGATE and a sub-scanning control signal XFGATE to determine when to start writing an image and an image width according to the synchronization detection signal XDETP, the pixel clock PCLK, a control signal from the printer controller 106, and the like.

The motor controller 107 generates a motor driving signal (driving signal) for adjusting a tilt of the folding mirror 215 based on the control signal from the printer controller 106, and sends the motor drive signal to a motor of a skew correction mechanism 219. The motor receives the driving signal and moves the folding mirror 215 in an instructed direction by an instructed amount. The skew correction mechanism (skew correction device) 219 may be provided on the second lens 214 instead of being provided on the folding mirror 215. The same applies to the method of driving the motor.

Each of the first sensor 91 and the second sensor 92 sends to the printer controller 106 data on a pattern for positional deviation correction detected by the corresponding one of the first sensor 91 or the second sensor 92. The printer controller 106 calculates a positional deviation amount, generates correction data to be set to the writing start position controller 102, the pixel clock generator 105, and the motor controller 107. The correction data is stored in the correction data memory 108.

When an image forming operation is performed, the correction data is retrieved from the correction data memory 108 according to an instruction from the printer controller 106. Then, the correction data is set to the writing start position controller 102, the pixel clock generator 105, and the motor controller 107.

Internal Configuration of Write Start Position Controller

Figure 5:
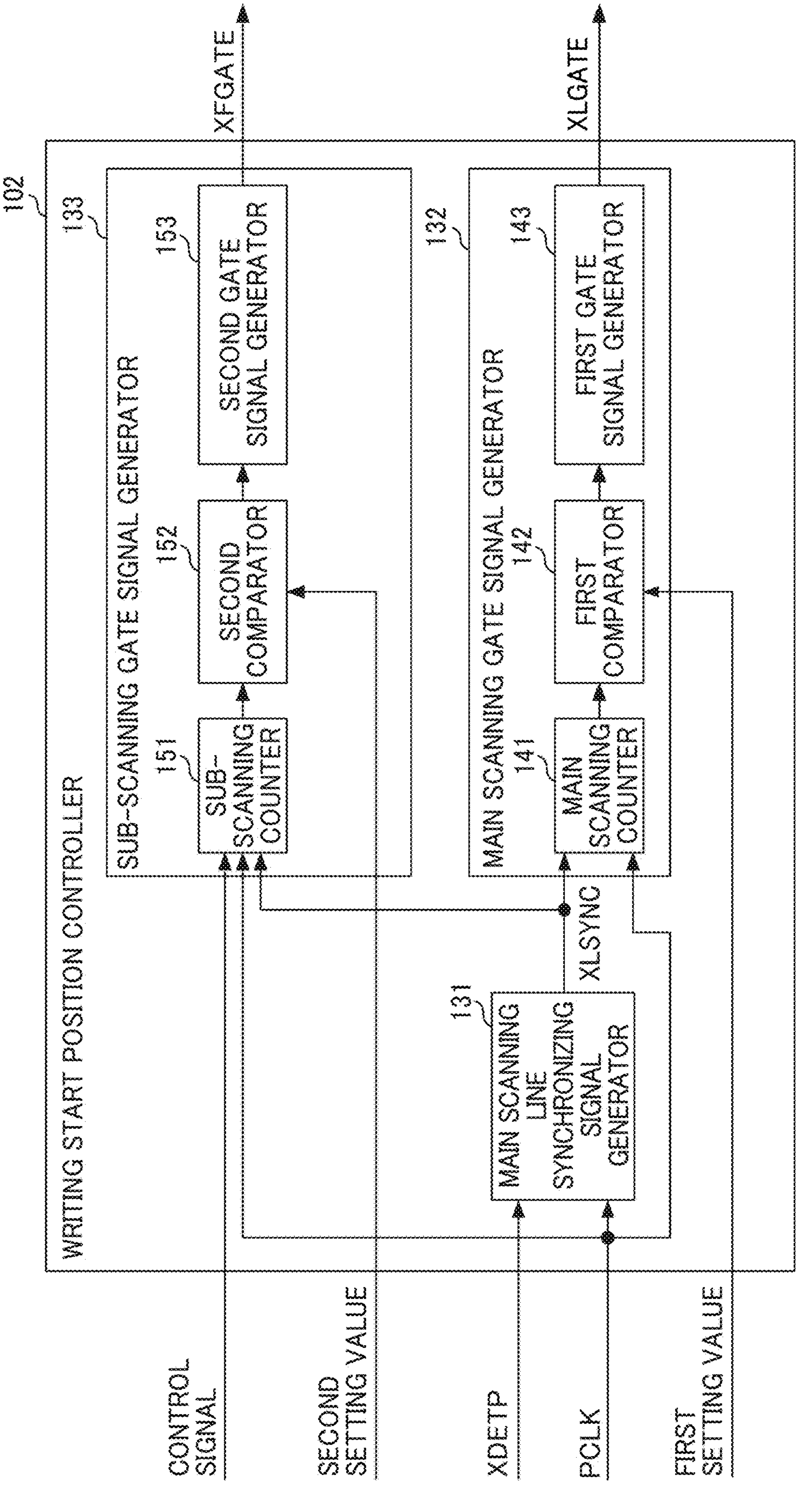
FIG. 5 is a block diagram illustrating an internal configuration of a writing start position controller illustrated in FIG. 3, according to the exemplary embodiment of the present disclosure.

FIG. 5 is a block diagram illustrating an internal configuration of the writing start position controller illustrated in FIG. 3, according to the exemplary embodiment of the present disclosure. As illustrated in FIG. 5, the writing start position controller 102 includes, for example, a main scanning line synchronizing signal generator 131, a main scanning gate signal generator 132, and a sub-scanning gate signal generator 133.

The main scanning gate signal generator 132 includes, for example, a main scanning counter 141 that operates with the XLSYNC and the pixel clock PCLK, a comparator 142 that compares the counter value with a first setting value (correction data) from the printer controller 106 and outputs a comparison result, and a gate signal generator 143 that generates a signal XLGATE that determines an image writing timing in the main scanning direction based on the comparison result from the comparator 142.

The sub-scanning gate signal generator 133 includes, for example, a sub-scanning counter 151 that operates with a control signal (print start signal) from the printer controller 106 (FIG. 3), the XLSYNC, and the PCLK, a comparator 152 that compares the counter value with a second setting value (correction data) from the printer controller 106 and outputs a comparison result, and a gate signal generator 153 that generates a signal XFGATE that determines an image writing timing in the sub-scanning direction based on the comparison result from the comparator 152.

Next, the operation of the writing start position controller 102 is described.

The main scan line synchronizing signal generator 131 generates a signal XLSYNC for operating the main scan counter 141 in the main scanning gate signal generator 132 and the sub-scanning counter 151 in the sub-scanning gate signal generator 133 and outputs the signal XLSYNC to the main scanning counter 141 and the sub-scanning counter 151.

The main scanning gate signal generator 132 generates a signal XLGATE that determines an image signal acquisition timing (image writing start timing in the main scanning direction) based on the input XLSYNC, and the sub-scanning gate signal generator 133 generates, based on the control signal, a signal XFGATE that determines an image signal acquisition timing (image writing start timing in the sub-scanning direction).

With respect to the main scanning, the writing start position controller 102 corrects a writing position on a per cycle basis of the pixel clock PCLK, that is, on a per dot basis. By contrast, with respect to the sub-scanning, the writing start position controller 102 corrects a writing position on a per cycle basis of the counter control signal XLSYNC, that is, on a per line basis. Note that, the corrected data both in the main scanning direction and in the sub-scanning direction is stored in the correction data memory 108.

Operation of Writing Start Position Controller in Main Scanning Direction

Figure 6:
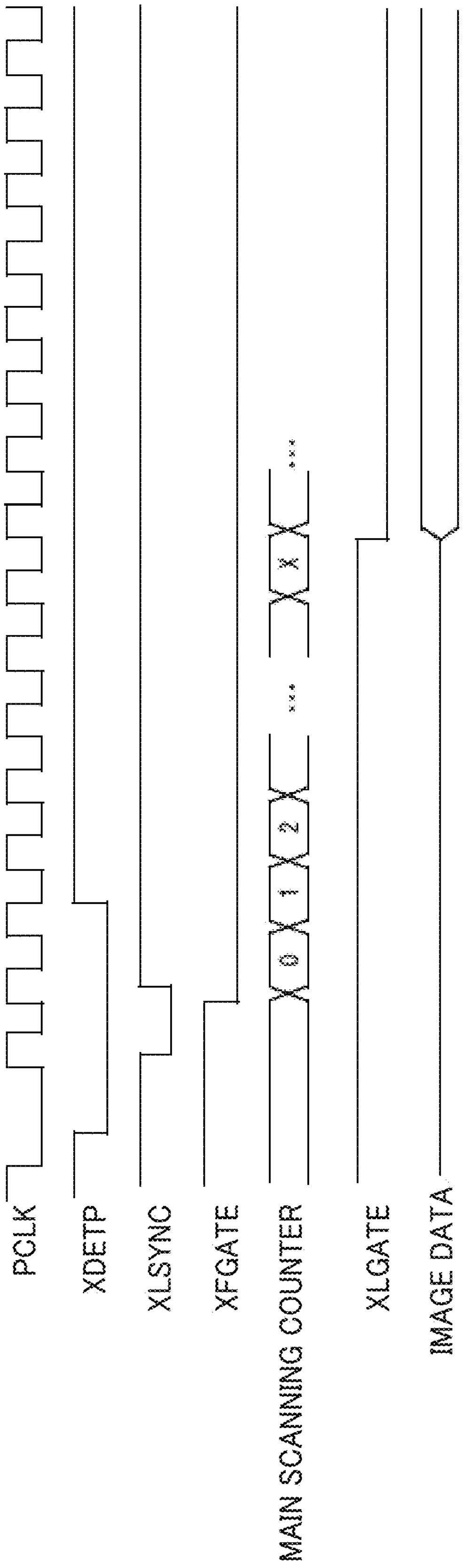
FIG. 6 is a timing chart illustrating operation of the writing start position controller in a main scanning direction, according to the exemplary embodiment of the present disclosure.

FIG. 6 is a timing chart illustrating the operation of the writing start position controller in the main scanning direction, according to the exemplary embodiment of the present disclosure. The main scanning counter 141 resets the counter value with the counter XLSYNC, and counts up the counter value with the pixel PCLK. When the counter value counted by the main scanning counter 141 reaches the first setting value (X in the example) set by the printer controller 106, the comparator 142 outputs the comparison result to the gate signal generator 143, and the XLGATE turns to a low level (valid) by the gate signal generator 143. The XLGATE is a signal whose level is lowered by the image width in the main scanning direction.

Operation of Writing Start Position Controller in Sub-scanning direction

Figure 7:
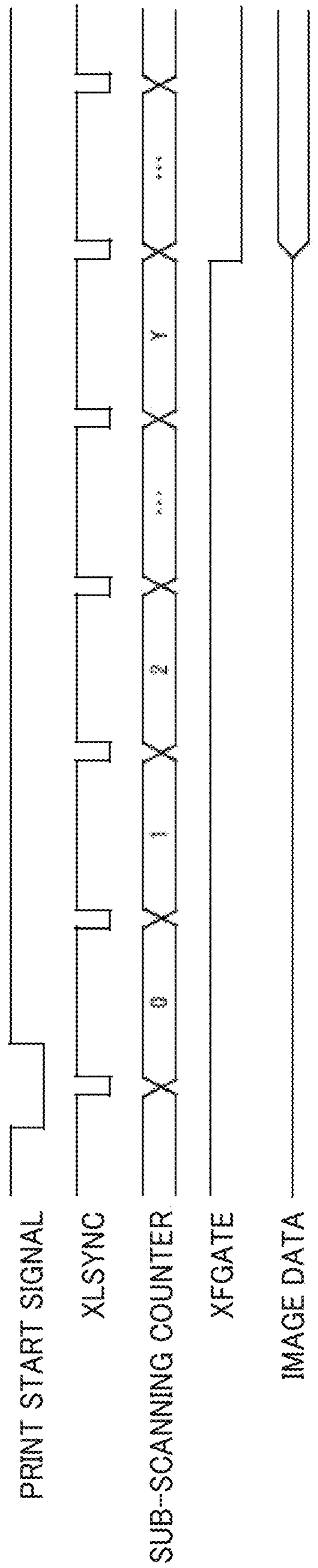
FIG. 7 is a timing chart illustrating operation of the writing start position controller in a sub-scanning direction, according to the exemplary embodiment of the present disclosure.

FIG. 7 is a timing chart illustrating the operation of the writing start position controller in the sub-scanning direction, according to the exemplary embodiment of the present disclosure. The sub-scanning counter 151 is reset by the print start signal from the printer controller 106, and counts up the counter value with the XLSYNC. When the counter value counted by the sub-scanning counter 151 reaches the second setting value (Y in the example) set by the printer controller 106, the comparator 152 outputs the comparison result to the gate signal generator 153, and the XFGATE turns to a low level (valid) by the gate signal generator 153. The XFGATE is a signal whose level is lowered by the image length in the sub-scanning direction.

Operation of Line Memory Provided before LD Controller

Figure 8:
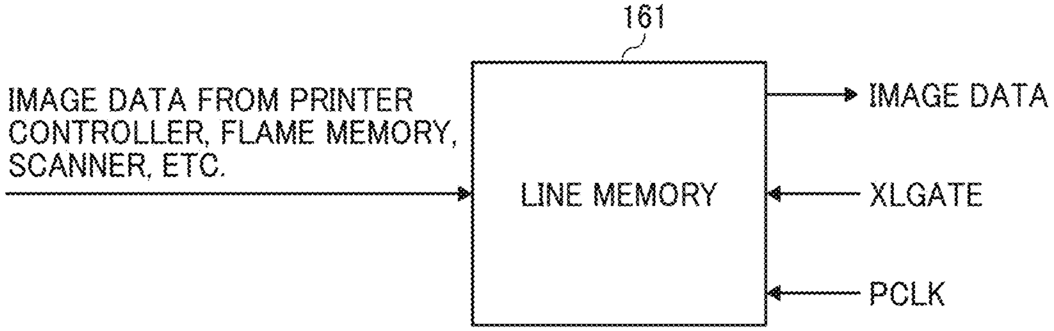
FIG. 8 is a diagram illustrating an input and outputs of a line memory provided before a laser diode (LD) controller illustrated in FIG. 3, according to the exemplary embodiment of the present disclosure.

FIG. 8 is a diagram illustrating an input and outputs of a line memory provided before the LD controller illustrated in FIG. 3, according to the exemplary embodiment of the present disclosure.

The line memory 161 captures image data from a printer controller, a frame memory, a scanner, etc. at the timing of XFGATE and XLGATE, and outputs image data in synchronization with PCLK. The output image data is sent to the LD controller 103 (FIG. 3), and each LD unit 211 lights up at that timing.

Skew Correction Mechanism

Figure 9:
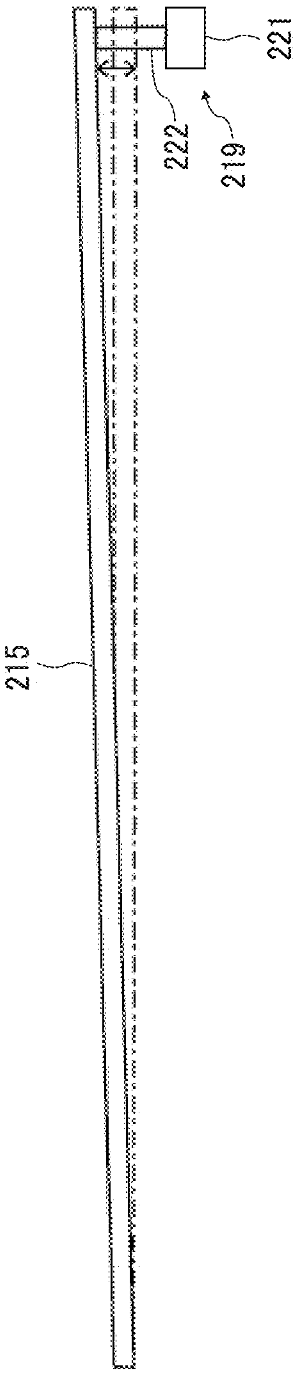
FIG. 9 is an illustration of a skew correction mechanism, according to the exemplary embodiment of the present disclosure.

FIG. 9 is an illustration of a skew correction mechanism, according to the exemplary embodiment of the present disclosure. As illustrated in FIG. 9, one end (in the example, the left end) of the folding mirror 215 is fixed, and the other end (in the example, the right end) is able to be displaced by the skew correction mechanism 219.

The skew correction mechanism 219 includes a stepping motor 221 and an adjuster 222 that moves forward and reverse by rotating the stepping motor 221 in the forward and reverse directions (a detailed description is given later). The stepping motor 221 is rotated according to a skew amount detected by the first sensor 91 and the second sensor 92 (FIG. 3), and the other end of the folding mirror 215 as an optical member of the light beam scanner 21 is displaced by the adjuster 222. Thereby, a tilt of the folding mirror 215 is changed to correct the skew. In addition a skew correction may be performed by changing a tilt of the second lens 214 that is attached with a skew correction mechanism similar to the above-mentioned skew correction mechanism.

Figure 10A:
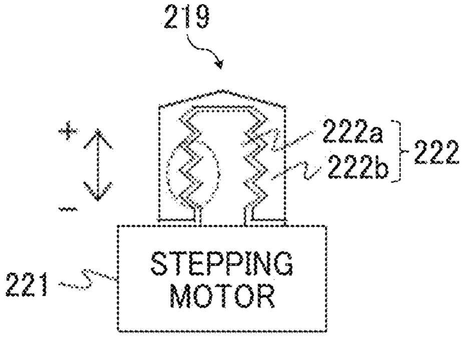
FIG. 10A to FIG. 10C are diagrams illustrating a schematic structure and operation of the skew correction mechanism and a change in the skew correction mechanism over time, according to the exemplary embodiment of the present disclosure.
Figure 10B:
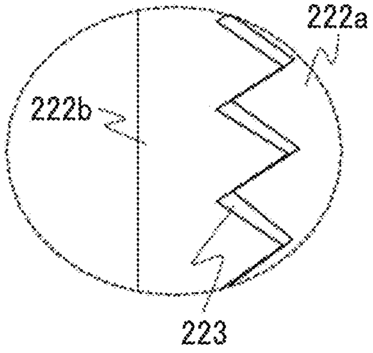
Figure 10C:
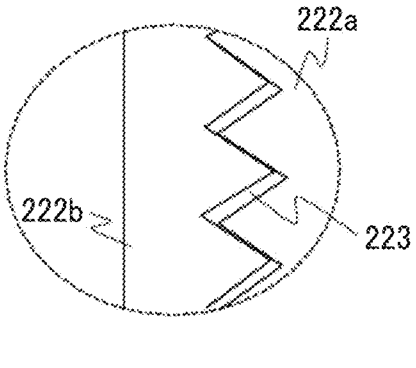

Configuration, Operation of Skew Correction Mechanism and Change of Skew Correction Mechanism over Time FIG. 10A to FIG. 10C are diagrams illustrating a schematic structure and operation the skew correction mechanism and a change in the skew correction mechanism over time, according to the exemplary embodiment of the present disclosure. FIG. 10A is an illustration of a schematic structure and operation of the skew correction mechanism according to the exemplary embodiment. FIG. 10B and FIG. 10C are illustrations of states of a part surrounded by a broken line in FIG. 10A. FIG. 10B is an illustration of a state immediately after the skew correction is performed, and FIG. 10C is an illustration of a state in which a change over time appears.

As illustrated in FIG. 10A, the skew correction mechanism 219 includes the stepping motor 221 and the adjuster 222. The adjuster 222 includes a rotation shaft 222*a* of a motor having a screw structure and a nut 222*b* fitted on the outside thereof. The rotation of the nut 222*h* is suppressed, and when the stepping motor 221 rotates in the forward and reverse directions, the nut 222*b* moves back and forth (moves up and down in the figure), and thereby the tilt of the folding mirror 215 or the second lens 214 is changed.

However, in a case where there is a backlash (play) 223 between the rotation shaft 222*a* and the nut 222*b* as illustrated in FIG. 10B and FIG. 10C, the nut 222*b* is in a state of still at a correction completion position immediately after the skew correction, as illustrated in FIG. 10B, and the nut 222*b* moves by the amount of the backlash 223 over time, as illustrated in FIG. 10C. The movement of the nut 222*b* also causes a change in the tilt of the folding mirror 215.

Figure 11:
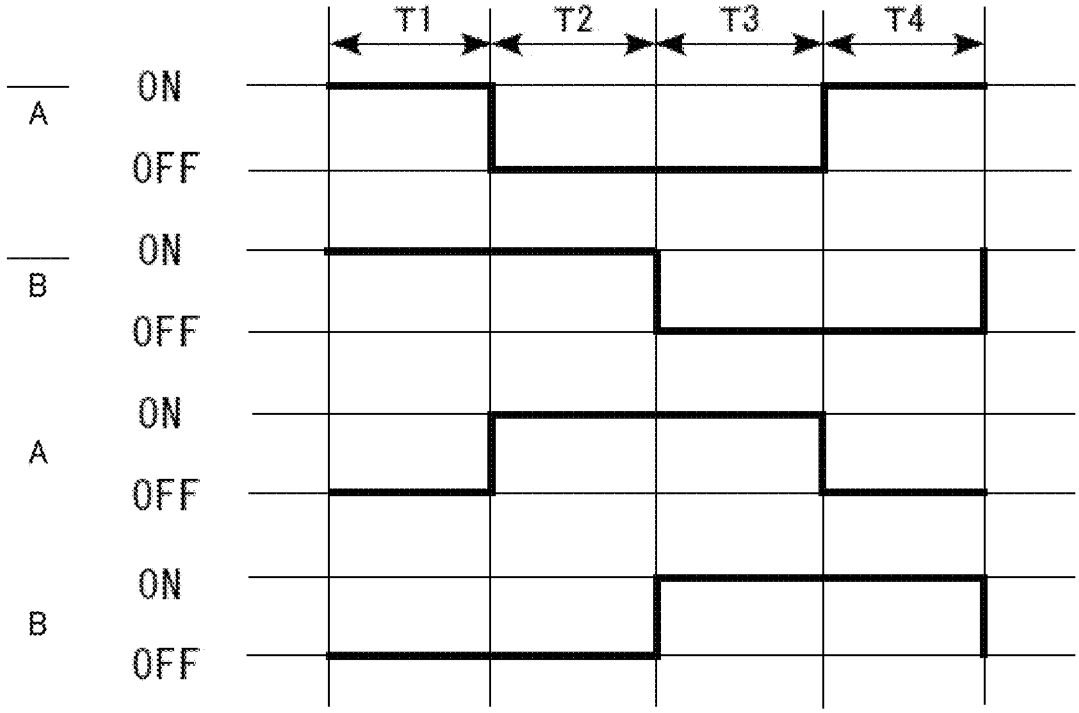
FIG. 11 is a timing chart of a control signal of a motor in the skew correction mechanism, according to the exemplary embodiment of the present disclosure.

Motor Control Signal FIG. 11 is a timing chart of a control signal of the motor in the skew correction mechanism, according to the exemplary embodiment of the present disclosure. In the description of the present embodiment, the motor is a four-phase stepping motor using a 2-2 phase excitation method, but the motor drive is not limited to this method.

In response to an instruction on a skew correction from the printer controller 106, the motor controller 107 generates a pulse as illustrated in FIG. 11 and outputs the pulse to the stepping motor 221. For example, when a transition is in a direction of T1, T2, T3, and T4 in this order, the stepping motor 221 rotates in the clockwise (CW) direction (hereinafter, this rotation is referred to as a normal rotation), and thereby a positive (plus) correction is performed. On the other hand, when the transition is made in the direction of T4, T3, 12, and T1 in this order, the stepping motor 221 rotates in the counterclockwise direction (CCW) (hereinafter, this rotation referred to as a reverse rotation), and thereby a negative (minus) correction is performed. One rotation (360 degrees) has four steps. In addition, when a "normal rotation" is performed, the correction is performed in the positive "+" direction illustrated in FIG. 10A. When a "reverse rotation" is performed, the correction is performed is performed in the negative "−" direction illustrated in FIG. 10A.

After calculating a skew correction amount, the printer controller 106 calculates a step amount based on the data on a step amount corresponding to a correction amount obtained in advance, and provide an instruction to the motor controller 107.

Since problems related to heat generation is reduced when the stepping motor 221 is excited only when the stepping motor 221 is operated, a state of each phase is stored in the correction data memory 108 and the excitation is turned off after the motor is operated, and when being operated at a next time, the stepping motor 221 starts with the previous excitation state.

Operation in Printing

Figure 12:
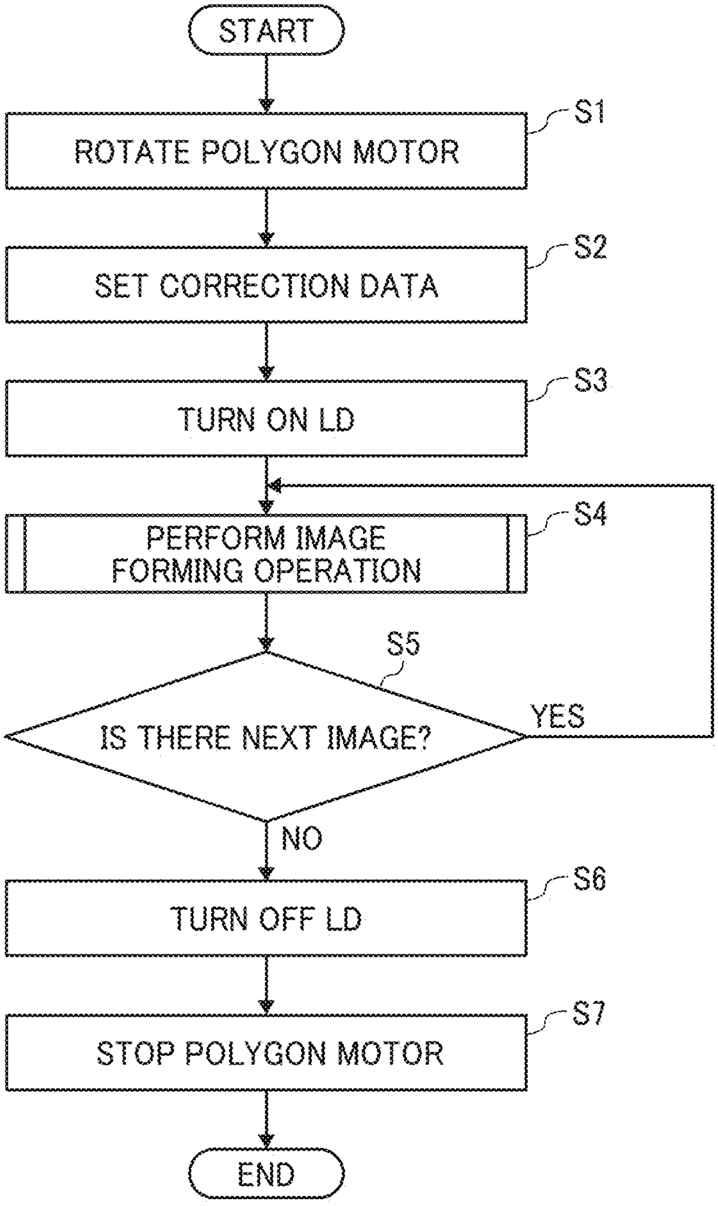
FIG. 12 is a flowchart illustrating a process performed by the image forming apparatus during printing according to the exemplary embodiment of the present disclosure.

FIG. 12 is a flowchart illustrating a process performed by the image forming apparatus during printing according to the exemplary-embodiment of the present disclosure.

When a start key on the operation panel is pressed, first, the polygon motor is caused to rotate at a predetermined rotation speed according to an instruction from the printer controller 106 (step S1).

Then, the correction data (the writing start position of the main scan and the sub scan, the set value of the magnification) is set in each control unit (step S2). The LD is turned on to output a synchronization detection signal, and perform automatic power control (APC) operation is performed to enable each LD to be turned on at a specified light amount (step S3).

Subsequently, an image forming operation is performed (step S4). After the image forming operation, whether a next image is present or not is determined (step S5). When there is no next image (step S5: No), the LD is turned off (step S6), the polygon motor is stopped (step S7), and the process ends. When there is a next image (step S5: Yes), the process goes back to step S4, and the image forming operation is repeated.

The skew correction does not necessarily be performed again as long as the stepping motor 221 is operated during the image positional deviation correction that is performed before printing.

Figure 13:
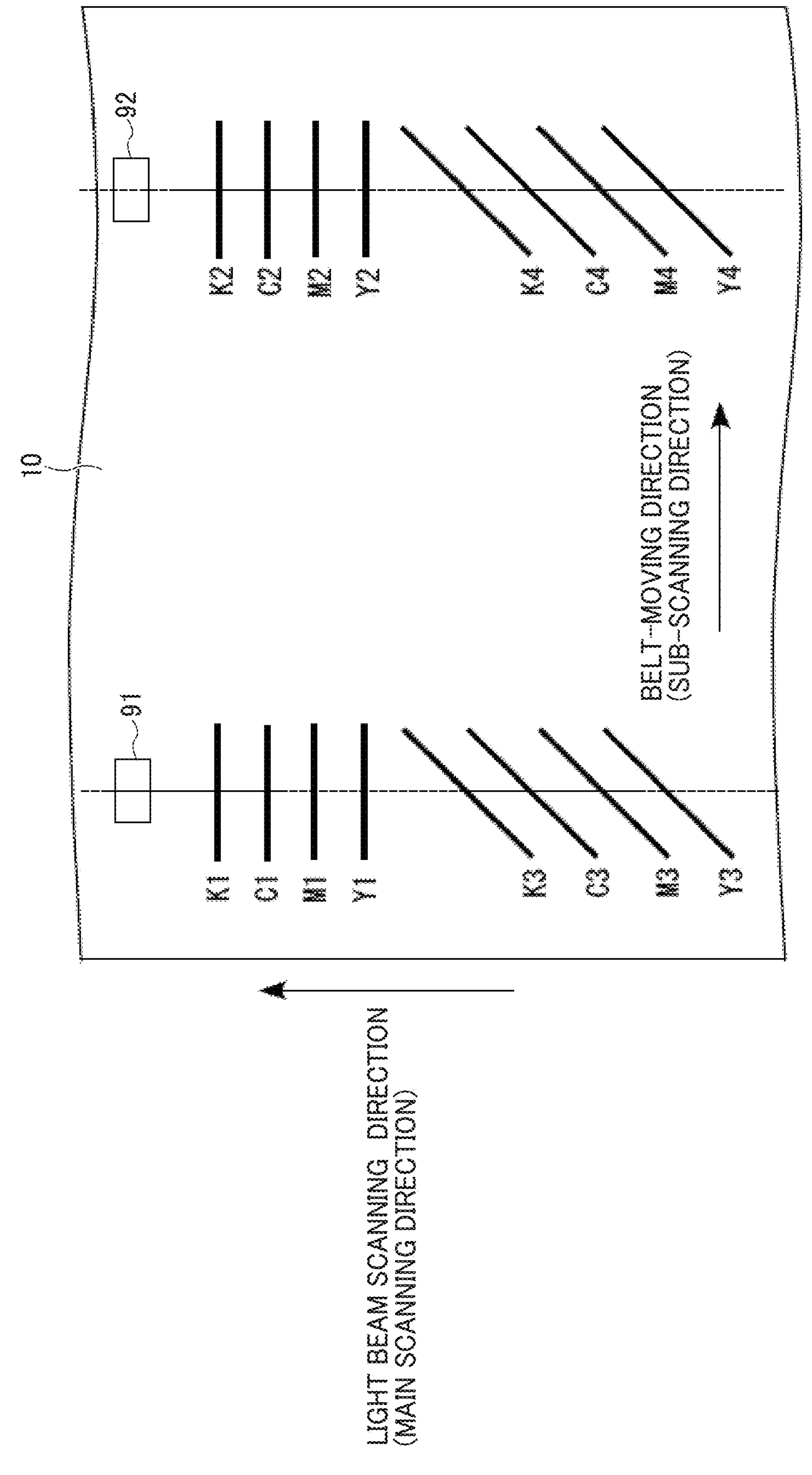
FIG. 13 is a diagram illustrating a pattern for positional deviation correction, according to the exemplary—embodiment of the present disclosure.

Pattern for Positional Deviation Correction FIG. 13 is a diagram illustrating a pattern for positional deviation correction, according to the exemplary embodiment of the present disclosure.

The pattern for positional deviation correction is formed during a period when an image to be printed is not formed, namely between sheets. The pattern for positional deviation correction may be formed before printing starts or after printing ends.

An image having horizontal lines and diagonal lines for each color is formed on the intermediate transfer belt 10. In the example of FIG. 13, the horizontal lines (Y1, M1, C1, and K1) and the diagonal lines (Y3, M3, C3, and K3) formed on a left side with respect to a moving direction of the intermediate transfer belt 10 and the horizontal lines (Y2, M2, C2, and K2) and the diagonal lines (Y4, M4, C4, and K4) formed on a right side with respect to the moving direction of the intermediate transfer belt 10 are illustrated.

When the intermediate transfer belt 10 moves in a belt-moving direction indicated by an arrow, the first sensor 91 and the second sensor 92 detects center positions of the horizontal lines and the diagonal lines for each color in the main scanning direction. The center position is namely an intersection between each line and a broken line in FIG. 13). Information on the detected center positions are transmitted to the printer controller 106, and an amount of deviation (time) for each color with respect to K color is calculated. A time when each diagonal line is detected changes according to a shift of the image position and image magnification in the main scanning direction, and a time when each horizontal line is detected changes according to a shift of the image position in the sub-scanning direction.

More specifically, with respect to the main scanning direction, a time from pattern K1 to pattern K3 that is used as a reference is compared with a time from pattern C1 to pattern. C3, and thereby a deviation TKC13 is obtained. In addition, a time from the pattern K2 to the pattern K4 that is used as a reference is compared with a time from the pattern C2 to the pattern C4, and thereby a deviation TKC24 is obtained. Since TKC24-TKC13 is a magnification error of the cyan image with respect to the black image, a frequency of the pixel clock is caused to be changed by the amount corresponding to the magnification error.

In addition, a deviation of the cyan image with respect to the black image in the main scanning is calculated by subtracting the amount of magnification error correction at the position of the first sensor 91 from the obtained TKC13. A timing of XLGATE signal that determines the writing start timing is caused to be changed by the amount corresponding to the deviation. The same applies to magenta and yellow.

Regarding the sub-scanning direction, in a case where an ideal time is a time from pattern K1 to pattern C1 is TKC1, and a time from pattern K2 to pattern C2 is TKC2, "{(TKC2+TKC1)/2}−Tc" is a deviation of the cyan image with respect to the black image in the stab-scanning direction. A timing of the XFGATE signal that determines the writing start timing is caused to be changed by the amount corresponding to the deviation. The same applies to magenta and yellow.

Further, regarding the skew, "TKC2-TKC1", which is the difference between TKC1 and TKC2, is a skew deviation of the cyan image with respect to the black image. The stepping motor 221 corrects the skew deviation by the amount corresponding to the difference. In calculating the correction amount, the positions of the first sensor 91 and the second sensor 92 that detect the deviation and the position where the stepping motor 221 that actually corrects is installed are different. Accordingly, the detected deviation amount is converted into the deviation amount at the position of the stepping motor 221, and thereby the correction amount that is to be actually set is obtained.

The pattern for positional deviation correction illustrated in FIG. 13 is an example, and is not the limiting. Further, forming a pattern for positional deviation correction using three or more positions in the main scanning direction and detecting the pattern increases the accuracy. Further, arranging a plurality of sets of patterns in the moving direction of the intermediate transfer belt 10 and obtaining an average of the amounts of deviation, results in reducing various errors.

First Example of Positional Deviation Correction

Figure 14:
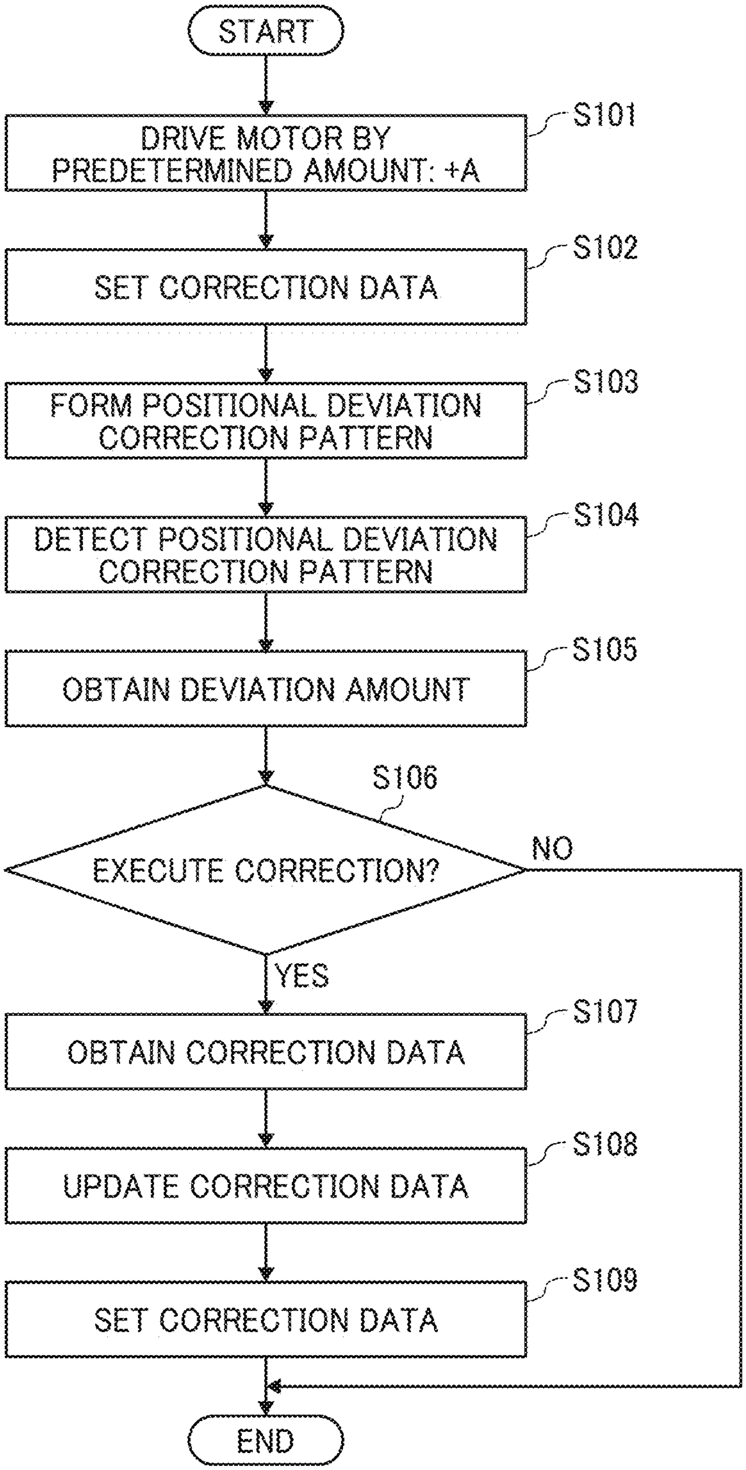
FIG. 14 is a flowchart illustrating a first example of positional deviation correction performed by the image forming apparatus according to the exemplary embodiment of the present disclosure.

FIG. 14 is a flowchart illustrating a first example of positional deviation correction performed by the image forming apparatus according to the exemplary embodiment of the present disclosure.

Under the control of the printer controller 106, an image positional deviation correction is performed at an appropriate timing. Such a timing to execute the image positional deviation correction is, for example, a time immediately after the power is turned on, each time when sheets of a specified number are printed, or a time when a monitored temperature becomes equal to or greater than a specified value.

The inclination of the scanning line of the light beam may have been changed due to a change of the tilt of the trading mirror 215 according to changes over time from the previous correction. In addition, the tilt of the scanning line of the light beam may have been changed due to the backlash of the stepping motor 221 according to changes over time from the previous correction. The stepping motor 221 of the skew correction mechanism 219 is driven by a predetermined amount: positive A (+A) (step S101). The rotation direction and the amount of rotation are determined in advance by confirming in advance that the folding mirror 215 be surely returned to the original position by correcting the tilt of the folding mirror 215. In addition, in the case of the present embodiment, since the operation is performed in a positive direction (+direction), a skew distortion may occur. However, a correction operation that is to be performed in a latter step also corrects the skew distortion, and thereby the occurrence of the skew direction in the current step do not have so much effect to the present embodiment.

Subsequently, the correction data, which is stored in the correction data memory 108, is set for each color (step S102). A pattern for positional deviation correction (positional deviation correction pattern) is formed (step S103). Next, each of the first sensor 91 and the second sensor 92 detects a pattern for positional deviation correction (step S104), and the printer controller 106 calculates a positional deviation amount for each color with respect to the reference color (step S105). When a plurality of sets of patterns is formed, an average value is calculated.

Then, whether to execute a correction is determined (step S106). For example, a determination to execute the correction is made when the positional deviation amount is equal to or greater than half a correction resolution. When the correction is executed (step S106: Yes), the correction data is calculated (step S107), the correction data memory 108 is updated with the calculated correction data (step S108), and the correction data is set to each controller. (Step S109).

The correction data includes a selling value of the pixel clock frequency that determines the image magnification in the main scanning direction, a setting value of the XLGAFE signal that determines the image position in the main scanning direction, a setting value of the XFGATE signal that determines the image position in the sub-scanning direction, and a setting value that determines the amount of skew correction in the sub-scanning direction. When the correction is not performed, the correction data is not updated. After the setting, the image forming operation is performed using the set correction value.

In a case where the image positional deviation correction is not performed due to a failure to detect a pattern for image positional deviation correction, a state regarding the skew has changed from the initial state by operating the motor (forward rotation) by +A. Due to this, the motor is preferably operated (to reverse) in the opposite direction by the same amount corresponding to +A.

In the case of the exemplary embodiment, the +direction is a pushing direction that is a direction of pushing the folding mirror 215 as illustrated in FIG. 10. Basically, when the amount is the same, there is no difference in the amount of movement depending on the moving direction. However, operating in the pushing direction has an advantage that even if a movable portion of the minor does not move well, it is easy to always stabilize the mirror at the same position in relation to a tilt and backlash of the folding mirror 215.

Second Example of Positional Deviation Correction

Figure 15:
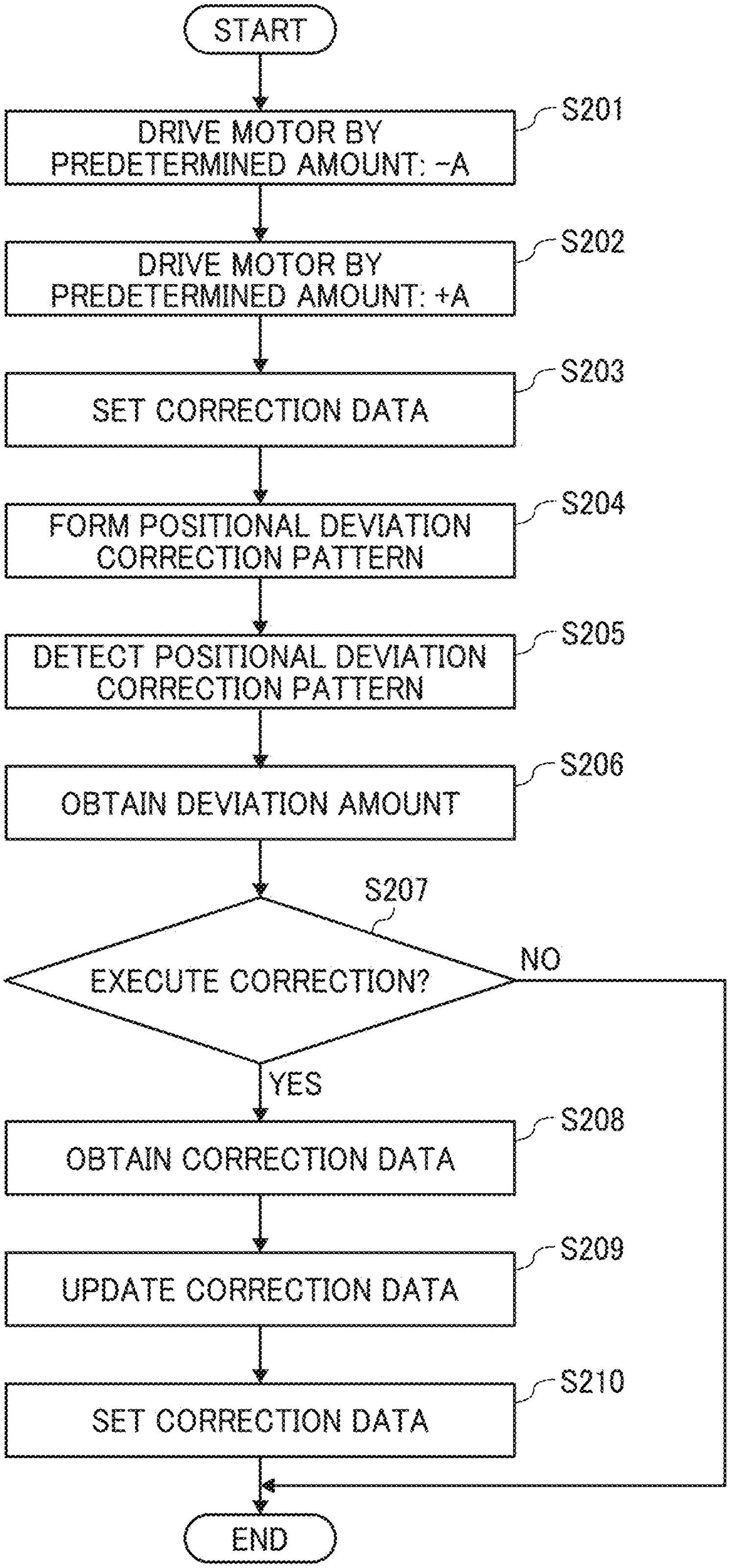
FIG. 15 is a flowchart illustrating a second example of positional deviation correction performed by the image forming apparatus according to the exemplary embodiment of the present disclosure.

FIG. 15 is a flowchart illustrating a second example of positional deviation correction performed by the image forming apparatus according to the exemplary embodiment of the present disclosure. Steps S202 to S210 in the flowchart are the same as steps S101 to S109 in FIG. 14 (first example). That is, the second example is different from the first example in that the stepping motor 221 is driven (operates to reversely rotate) by the predetermined amount that is −A, and then is driven (operates to normally rotate) by the same amount that is +A.

In the case of the second example, the stepping motor 221 is driven in the both positive and negative directions with the same amount, and accordingly a state regarding the skew is substantially the same as before the operation except for the tilt of the folding mirror 215 and the influence of backlash. In the above-described case, the stepping motor 221 is not required to be operated even if the image positional deviation correction is not subsequently performed.

In the case of the second example, the +direction is a pushing direction that is a, direction of pushing the folding mirror 215 as illustrated in FIG. 10. Basically, when the amount is the same, there is no difference in the amount of movement depending on the moving direction. However, in operating in the pushing direction, even if a movable portion of the mirror does not move well, it is easy to always stabilize the mirror at the same position in relation to a tilt and backlash of the folding mirror 215. Accordingly, the stepping motor 221 is operated in the − direction first, and then in the + direction.

Further, in the second example, the operation is first performed in the negative (−) direction and then in the positive (+) direction, but it is better to end the operation in the same direction. This is because even if an error occurs depending on the direction of operation, the variation in the operations is reduced when the state stays in the same.

In a conventional skew correction performed by an adjustment mechanism, which is mechanical, the optical members, which are not fixed, are required to have movable structures. As a result, changes over time, more specifically, a change of a tilt of the optical member caused by a change in a dimension of the adjustment mechanism caused by temperature changes, and a change of a tilt of the optical member caused by movement of a backlash (play) of the adjustment mechanism occur.

Then, in the image positional deviation correction, a pattern for positional deviation correction is formed in a state where the tilt of the optical member is not normal, that is, in a state where a "shift" occurs. As a result, when the actuator is driven for skew correction, an amount of the backlash is also removed at the same time, so that the image positional deviation remains by the amount corresponding to the backlash.

An object of the present embodiment is to reliably perform an image positional deviation correction. According to the above-described embodiment, it is possible to reliably correct the image position deviation.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image forming apparatus, comprising:

a light beam scanner configured to scan an image bearer by a light beam according to data on a pattern for image positional deviation correction;

a developing device configured to develop a latent image of the pattern for positional deviation correction, the pattern for positional deviation correction being formed on the image bearer by scanning performed by the light beam scanner;

a sensor configured to read the pattern for image positional deviation correction to obtain an amount of image positional deviation;

a skew correction device configured to adjust a tilt of an optical member of the light beam scanner according to a skew amount to correct a skew and perform the image positional deviation correction according to the amount of image positional deviation, the skew correction device including, a stepping motor, a rotation shaft extending from the stepping motor in a first direction perpendicular to the stepping motor, and an adjuster attached to the optical member and an outside of the rotation shaft of the stepping motor, the adjuster configured to change the tilt of the optical member by moving a center of the adjuster towards or away from the stepping motor in the first direction, the center of the adjuster being coincident with an axis of rotation of the rotation shaft and the movement being caused by a rotation of the stepping motor; and circuitry configured to drive the skew correction device before the image positional deviation correction, and cause the stepping motor to rotate, from a starting position of the stepping motor at a start of a skew correction operation, by a given amount in a positive direction and by the given amount in a negative direction prior to reading the pattern for image positional deviation correction in a same skew correction operation.

2. The image forming apparatus of claim 1, wherein the adjuster is attached to the outside of the rotation shaft of the stepping motor so as to have a backlash.

3. The image forming apparatus of claim 1, wherein the positive direction is a same direction as a rotation direction at an end of a previous operation performed by the image forming apparatus most recently prior to a correction.

4. The image forming apparatus of claim 3, wherein the direction to which the adjuster pushes the optical member depends upon the rotation direction.

5. The image forming apparatus of claim 1, wherein the optical member is attached to the adjuster at a first end of the optical member, and a second end of the optical member, opposite from the first end, is fixed in position.

6. The image forming apparatus of claim 1, wherein a full rotation of the stepping motor includes four steps.

7. The image forming apparatus of claim 1, wherein the pattern for positional deviation correction includes at least one horizontal line with respect to a scanning direction and at least one diagonal line with respect to the scanning direction.

8. The image forming apparatus of claim 1, wherein the circuitry is configured to determine the amount of image positional deviation in a second direction perpendicular to a belt-moving direction of the image bearer.

9. The image forming apparatus of claim 1, wherein the circuitry is configured to determine the amount of image positional deviation in a second direction corresponding to a belt-moving direction of the image bearer.

10. The image forming apparatus of claim 9, wherein the pattern for positional deviation correction includes first and second patterns corresponding to a first color and third and fourth patterns corresponding to a second color, and the circuitry is configured to determine the skew amount based on a difference between a time from the first pattern to the third pattern and a time from the second pattern to the fourth pattern.

11. An image forming apparatus, comprising:

means for scanning an image bearer by a light beam according to data on a pattern for image positional deviation correction;

means for developing a latent image of the pattern for positional deviation correction, the pattern for positional deviation correction being formed on the image bearer by the means for scanning;

means for transferring the pattern for positional deviation correction formed on the image bearer to a medium;

means for reading the pattern for image positional deviation correction to obtain an amount of image positional deviation;

means for adjusting a tilt of an optical member of the means for scanning according to a skew amount to correct a skew and performing the image positional deviation correction according to the amount of image positional deviation, the means for adjusting including, a stepping motor, a rotation shaft extending from the stepping motor in a first direction perpendicular to the stepping motor, and an adjuster attached to the optical member and an outside of the rotation shaft of the stepping motor, the adjuster configured to change the tilt of the optical member by moving a center of the adjuster towards or away from the stepping motor in the first direction, the center of the adjuster being coincident with an axis of rotation of the rotation shaft and the movement being caused by a rotation of the stepping motor; and means for driving the means for adjusting before the image positional deviation correction, wherein the means for driving is configured to rotate the stepping motor, from a starting position of the stepping motor at a start of a skew correction operation, by a given amount in a positive direction and by the given amount in a negative direction prior to reading the pattern for image positional deviation correction in a same skew correction operation.

12. A method of correcting image positional deviation, comprising:

scanning an image bearer by a light beam according to data on a pattern for image positional deviation correction;

developing a latent image of the pattern for positional deviation correction, the pattern for positional deviation correction being formed on the image bearer by the scanning;

reading the pattern for image positional deviation correction to obtain an amount of image positional deviation;

adjusting a tilt of an optical member of a light beam scanner according to a skew amount to correct a skew via a skew correction device, the skew correction device including, a stepping motor, a rotation shaft extending from the stepping motor in a first direction perpendicular to the stepping motor, and an adjuster attached to the optical member and an outside of the rotation shaft of the stepping motor, the adjuster configured to change the tilt of the optical member by moving a center of the adjuster towards or away from the stepping motor in the first direction, the center of the adjuster being coincident with an axis of rotation of the rotation shaft and the movement being caused by a rotation of the stepping motor;

performing the image positional deviation correction according to the amount of image positional deviation after the tilt of the optical member is changed; and rotating the stepping motor, from a starting position of the stepping motor at a start of a skew correction operation, by a given amount in a positive direction and by the given amount in a negative direction prior to reading the pattern for image positional deviation correction in a same skew correction operation.

13. The method of claim 12, wherein the optical member is attached to the adjuster at a first end of the optical member, and a second end of the optical member, opposite from the first end, is fixed in position.

14. The method of claim 12, wherein a full rotation of the stepping motor includes four steps.

15. The method of claim 12, wherein the pattern for positional deviation correction includes at least one horizontal line with respect to a scanning direction and at least one diagonal line with respect to the scanning direction.

16. The method of claim 12, further comprising:

determining the amount image positional deviation in a second direction perpendicular to a belt-moving direction of the image bearer.

17. The method of claim 12, further comprising:

determining the amount image positional deviation in a second direction corresponding to a belt-moving direction of the image bearer.

* * * * *